United States Patent
Swaminathan

(10) Patent No.: US 12,014,042 B2
(45) Date of Patent: *Jun. 18, 2024

(54) DRAG AND DROP FUNCTIONS TO START THE PROCESS OF APPLYING FOR FINANCIAL SERVICES

(71) Applicant: Truist Bank, Charlotte, NC (US)

(72) Inventor: Sudhakar Swaminathan, Duluth, GA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,486

(22) Filed: May 22, 2023

(65) Prior Publication Data

US 2023/0409184 A1 Dec. 21, 2023

Related U.S. Application Data

(63) Continuation of application No. 17/843,091, filed on Jun. 17, 2022, now Pat. No. 11,687,228.

(51) Int. Cl.
*G06F 3/0486* (2013.01)
*G06F 3/04815* (2022.01)
(Continued)

(52) U.S. Cl.
CPC ........ *G06F 3/0486* (2013.01); *G06F 3/04815* (2013.01); *G06F 3/0482* (2013.01);
(Continued)

(58) Field of Classification Search
CPC .. G06F 3/0486; G06F 3/04815; G06F 3/0482; G06F 3/04886; G06F 2203/04803; G06F 2203/04808; G06Q 40/03
See application file for complete search history.

(56) References Cited

U.S. PATENT DOCUMENTS 11,017,611 B1 * 5/2021 Mount ................... G06V 20/20
11,687,228 B1    6/2023 Swaminathan
(Continued)

OTHER PUBLICATIONS

Non-Final Office Action, U.S. Appl. No. 17/843,091, Oct. 27, 2022, Oct. 27, 2022, 23 pages.
(Continued)

*Primary Examiner* — Daniel Samwel
(74) *Attorney, Agent, or Firm* — Kilpatrick Townsend & Stockton LLP; Michael A. Springs, Esq.

(57) ABSTRACT

In an example, a method involves displaying interface objects and avatar interface objects on a user interface. Each interface object represents one of a set of financial services available within a financial system. The method also involves detecting a selection of an avatar interface object from the plurality of avatar interface objects, followed by detecting a movement of the selected avatar interface object and moving, on the user interface, the selected avatar interface object according to the movement. The method further involves detecting a placement of the selected avatar interface object on the user interface and, in response to detecting the placement, initiating an application for the financial service corresponding to the selected avatar interface object and displaying, on the user interface, a result of the application.

18 Claims, 12 Drawing Sheets

(51) Int. Cl.
    *G06F 3/0482* (2013.01)
    *G06F 3/04886* (2022.01)
    *G06Q 40/03* (2023.01)

(52) U.S. Cl.
    CPC ......... *G06F 3/04886* (2013.01); *G06Q 40/03* (2023.01); *G06F 2203/04803* (2013.01); *G06F 2203/04808* (2013.01)

(56) References Cited

U.S. PATENT DOCUMENTS

| | | | |
|---|---|---|---|
| 2010/0328225 A1 | 12/2010 | Black | |
| 2016/0196692 A1* | 7/2016 | Kjallstrom | G06T 19/006 |
| | | | 345/633 |
| 2017/0018031 A1* | 1/2017 | Bandy | H04L 67/01 |
| 2018/0005208 A1 | 1/2018 | Aggarwal et al. | |
| 2018/0158156 A1* | 6/2018 | Dintenfass | G06F 21/32 |
| 2019/0278621 A1* | 9/2019 | Thomas | G06F 3/011 |
| 2020/0257245 A1* | 8/2020 | Linville | G03H 1/2249 |
| 2020/0357051 A1 | 11/2020 | Hunt et al. | |
| 2021/0263593 A1* | 8/2021 | Lacey | G06F 3/017 |

OTHER PUBLICATIONS

Notice of Allowance, U.S. Appl. No. 17/843,091, Feb. 9, 2023, 6 pages.

* cited by examiner

DRAG AND DROP FUNCTIONS TO START THE PROCESS OF APPLYING FOR FINANCIAL SERVICES

CROSS-REFERENCE TO RELATED APPLICATIONS

This is a continuation of application Ser. No. 17/843,091, filed Jun. 17, 2022, and titled "DRAG AND DROP FUNCTIONS TO START THE PROCESS OF APPLYING FOR FINANCIAL SERVICES," the entirety of which is incorporated herein by reference.

TECHNICAL FIELD

The present disclosure relates to computing technology, in particular user interfaces that facilitate improved interactions with electronic financial systems.

BACKGROUND

Online financial systems are prevalent. But traditional user interfaces for interacting with online financial systems can be lacking and have not changed dramatically since their introduction. As most interactions with financial systems are performed electronically, new methods of interaction are needed that enable users to leverage new financial services features.

SUMMARY

In an example, a method involves displaying, in a first area of an interface displayed on a virtual reality device, interface objects at different locations within the first area. Each interface object represents one of a set financial services available within a financial system. The method further involves displaying a second area on the interface and on the virtual reality device. The method further involves, while displaying the interface, detecting, from the virtual reality device, a selection followed by a movement of an interface object of the interface objects. The method further involves moving, on the interface displayed on the virtual reality device, the interface object according to the movement. The method further involves detecting, via the virtual reality device, a placement of the interface object in the second area. The method further involves, in response to detecting the placement: initiating an application for the financial service corresponding to the interface object; and displaying, in the second area on the virtual reality device, a result of the application.

In another example, the method involves, in response to detecting the placement, displaying an additional user interface object on the virtual reality device.

In another example, the selection includes a pinch gesture and the placement includes a relaxing of the pinch gesture.

In another example, the selection includes a first tap at a first location and the placement includes a second tap at a second location.

In another example, the moving includes a drag gesture of a finger.

In another example, initiating the application includes transmitting, to a financial server device, information associated with a user associated with the virtual reality device, and the method further involves obtaining the result. The result is determined by the financial server device based on the information.

In another example, the method involves displaying, in the interface, a interface objects, each object associated with a respective main interface. Each of the main interfaces enables a user to access data and transact with one or more of the financial services. The main interfaces include a first main interface having a first window depicting the financial services and a second window depicting transactions corresponding to at least one of the financial services. The main interfaces further include a second main interface having an avatar interface objects at different locations within the second main interface. Each avatar interface object represents one of the financial services. The method further involves, while displaying the interface on the virtual reality device, detecting a selection of an interface object from the virtual reality device. The method further involves, in response to receiving the selection, updating the interface with the main interface that corresponds to the selected object.

While the above examples are discussed as computer-implemented methods, it will be appreciated that the above functionality can be implemented in a system such as a computer system and/or as computer-executable instructions stored on a non-transitory computer-readable medium.

BRIEF DESCRIPTION OF THE DRAWINGS

FIG. 4, which includes

DETAILED DESCRIPTION

Figure 1:
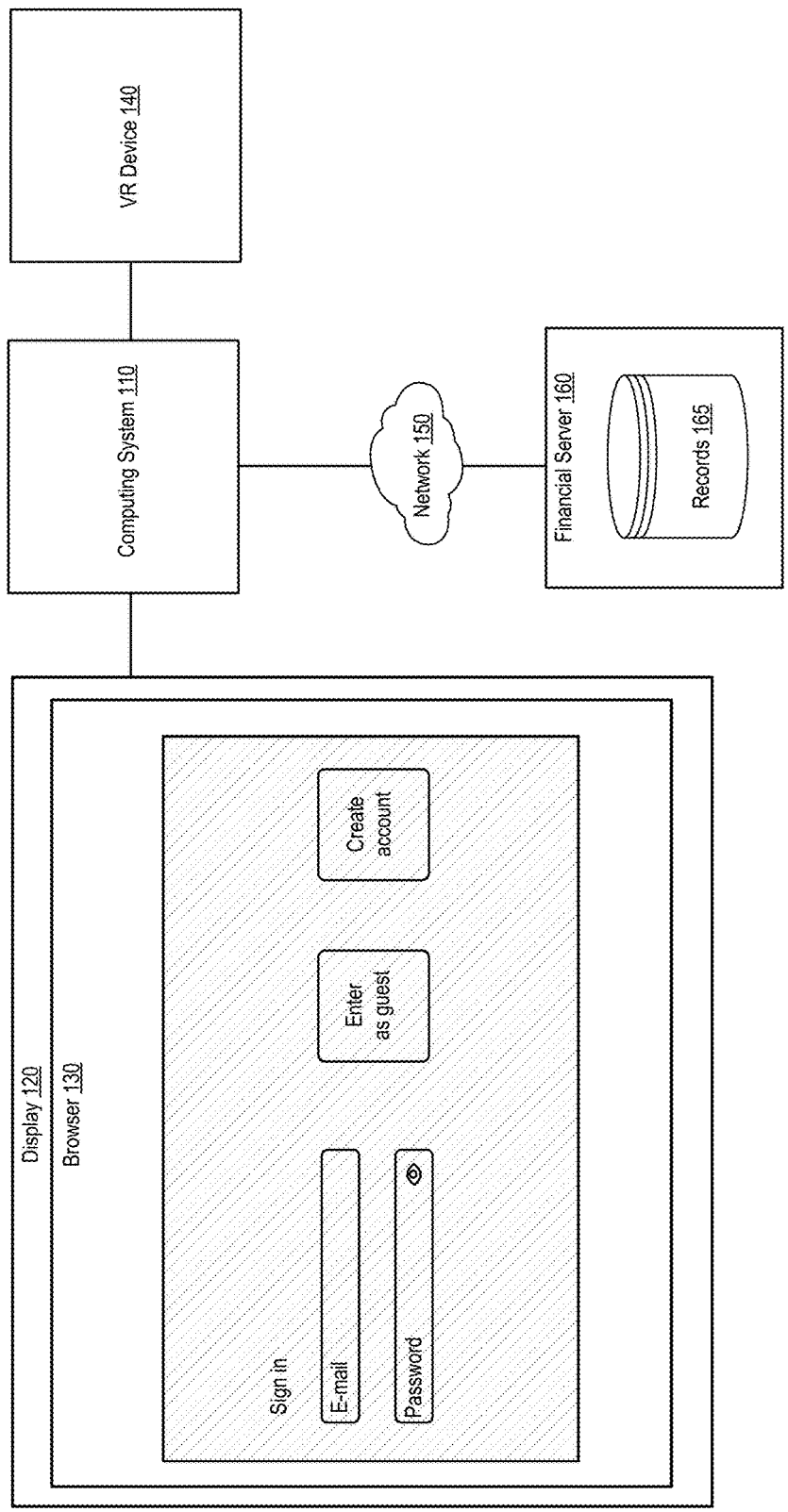
FIG. 1 depicts an example of a computing system configured for accessing electronic financial systems, in accordance with an embodiment.

Embodiments of the present invention relate to improved user interfaces for interactions with electronic financial systems. For instance, certain embodiments involve gamified user interfaces, autonomous agent-based interfaces, or virtual reality-based user interfaces. These interfaces provide for flexibility and customization in the methods in which computing devices enable interaction with electronic financial systems.

In a simplified example introduced for discussion purposes, a user computing device connects to a financial services server. The financial services server can be part of a network of servers that collectively provide financial services such as online banking, insurance, home financing, auto financing, and so forth. The financial services server authenticates the user device using one or more techniques such as a login and password, two-factor authentication, and/or biometric authentication. After successful authentication, the user computing device presents, in the web browser or via a virtual reality device, an initial screen that permits the user to select one or more different user interfaces for use in the browser.

In another example, disclosed techniques relate to using virtual reality to interact with user interfaces for financial services, specifically using drag-and-drop to apply for new financial services. For instance, using a virtual reality headset, a user selects an object corresponding to a financial service and drops the object in a specific location within their view. A computing system then initiates the process for applying to a new financial service.

The user interfaces disclosed herein can facilitate the representation of financial functions. Examples of user interfaces include traditional user interfaces, for example, with lists of accounts and transactions; gamified user interfaces in which different functions or services are represented as avatars or icons; user interfaces that allow drag-and-drop functionality; agent based interfaces in which a user may select financial services and/or transact with the financial services by way of messaging in English or another language with an autonomous (e.g., computer-generated) agent or a remotely located agent; virtual reality-based user interfaces in which a user navigates financial services and transactions from within one or more virtual rooms; or any combination thereof.

Additionally, disclosed techniques allow a user to adjust their preferences with respect to user interfaces one or more times during a financial services session. For instance, a user may start an online session with a more traditional user interface and then decide that they wish to ask specific questions and switch to an interactive session with an autonomous agent. Similarly, the user may switch back to the traditional interface, or to another interface such as a gamified interface, and so on. Accordingly, technical advantages of the disclosed solutions include the ability to dynamically update not only the content of the user interface on a computing device but also the style and format of the user interface, based on interactions received from a user computing device.

Turning now to the Figures, FIG. 1 depicts an example of a computing system configured for accessing electronic financial systems, in accordance with an embodiment. FIG. 1 depicts computing system 110, display 120, browser 130, virtual reality device 140, network 150 and financial server 160, and records 165. In the example depicted, computing system 110 facilitates interactions with financial server 160 via computing devices that use one or more different user interfaces and/or employ interactive techniques such as Virtual Reality (VR).

In turn, computing system 110 connects via network 150 to financial server 160 to obtain financial records from records 165 or initiate electronic financial transactions.

Records 165 can include financial statements, records, transactions, and/or other financial information. Computing system 110 and financial server 160 include one or more processors, memories, storage devices, and/or network connections. An example of computing system 110 includes computing system 1200 depicted in FIG. 12.

Non-limiting examples of user interfaces include classic financial service interfaces such as those with side-by-side service and transaction views, gamified user interfaces, and autonomous-agent based user interfaces. In some examples, these user interfaces are used to access financial services via financial server 160 by using browser 130 on display 120. Traditional interactive methods such as a mouse, keyboard, voice-based systems, and other similar techniques can be used.

The user interfaces described herein can be accessed and interacted via one or more VR devices. Examples of VR devices include VR headsets, handsets, joysticks, gloves having electronic sensors therein, and so forth. For instance, a user wearing one or more VR devices can navigate a user interface, check transactions in a bank account, open a new account, explore new products, and so forth. Examples of suitable VR devices include the VR headset as depicted with respect to FIG. 4, but other VR devices are possible.

Figure 2:
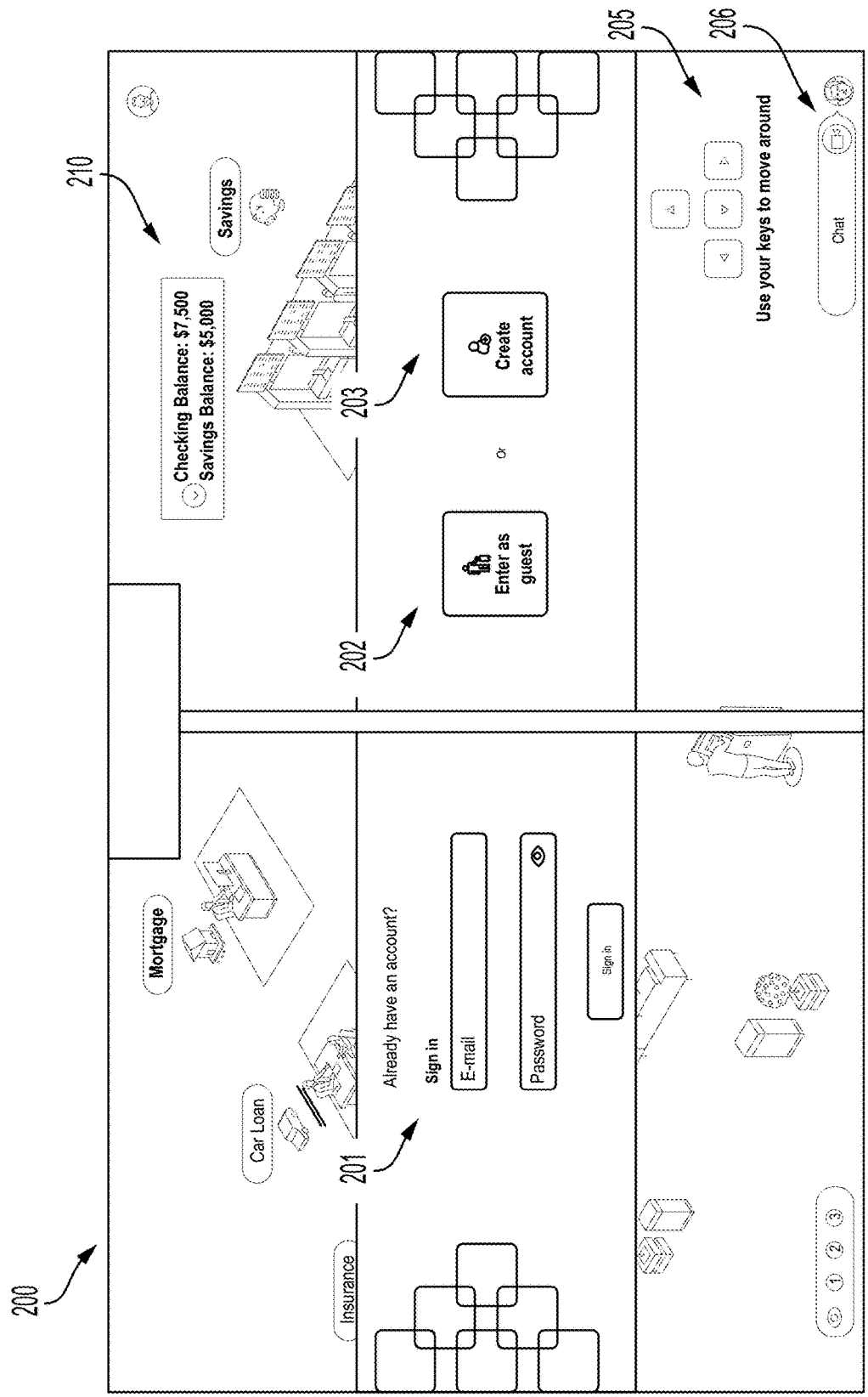
FIG. 2 depicts an example of an initial interface for an electronic financial system, in accordance with an embodiment.

FIG. 2 depicts an example of a user interface 200 for an electronic financial system, in accordance with an embodiment. User interface (UI) 200 depicts a sign in prompt 201, which includes username and password fields; a guest login object 202, an account creation object 203, navigation objects 205, chat window 206, and background 210. A user operating computing system 110 can interact with user interface 200 using a keyboard, mouse, or other techniques, to access electronic financial services.

In some cases, when a user first accesses a financial system via computing system 110, the user is presented with user interface 200. In some cases, one or more authentication devices can be used such as biometric devices (e.g., fingerprint scanners), two-factor authentication devices, and so forth. For example, during the login process but before accessing any financial information, computing system 110 can require additional authentication. In other cases, one or more accessibility functions are provided to access computing system 110, such as external accessibility devices, screen readers, text-to-speech systems, and so forth.

In some examples, a user may enter the financial system as a guest by selecting guest login object 202. This enables the user to try out the financial system. In this case, artificially-created data is presented such as artificial transactions. No actual transactions take place in this example. In other examples, a user may not yet either have a login to the financial system (for instance if they have a banking account but have not yet created a login), or may not have an account at all and may need to open an account. The account creation object 203 is available for such a case.

Navigation objects 205 serve as indicators that the user may navigate the interface using their keyboard (specifically with the up, down, left, and right buttons). In some cases, a user may click on navigation objects 205 to navigate the interface. Chat window 206 is available for interactions with either a human or autonomous agent. For instance, if a user has a problem logging in, they can send a message in chat window 206. In other cases, a new user may have questions about products and services.

Background 210 is depicted behind sign in prompt 201, a guest login object 202, and account creation object 203. Background 210 can be a shaded, generic, or anonymized view of the other user interfaces described herein. Interactions between the user and the objects in background 210 are not possible. Rather, background 210 is there as a preview of the types of user interfaces available after login. In this manner, background 210 serves as a store front of available user interfaces. Upon successful login, the user may be presented with another user interface. Examples include, but are not limited to, e.g., FIG. 3 or FIG. 5.

Figure 3:
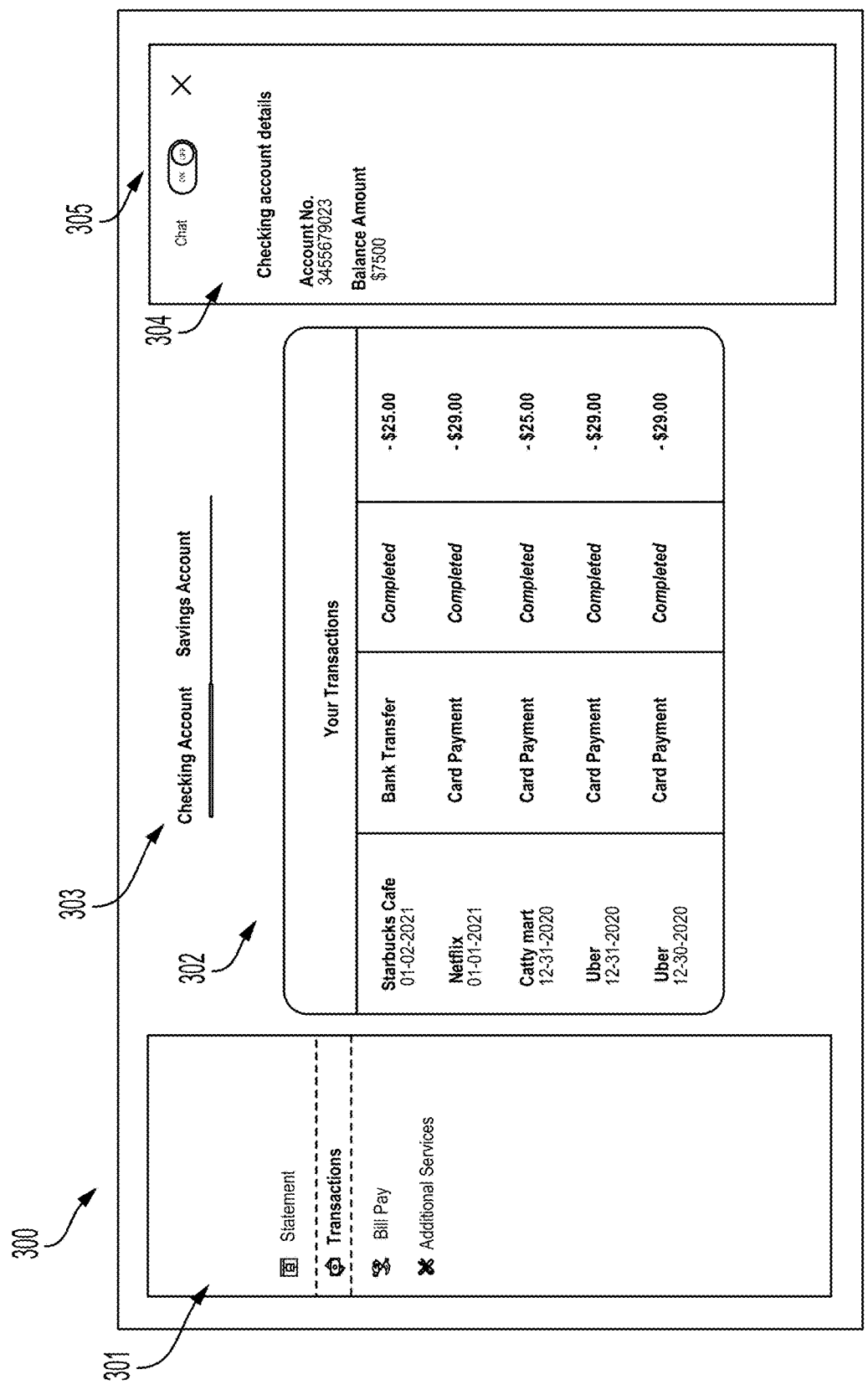
FIG. 3 depicts an example of a user interface showing transactions within an electronic financial system, in accordance with an embodiment.

FIG. 3 depicts an example of a user interface 300 showing transactions within an electronic financial system, in accordance with an embodiment. User interface 300 depicts options pane 301, which includes various options such as statements, transactions, bill pay, and so forth; transactions pane 302, which shows transactions; tab selector 303, which facilitates switching between accounts (e.g., "checking" and "savings"); details pane 304, which shows details about a selected account; and chat button 305, which enables a user to invoke the chat function to chat with an agent or an autonomous agent.

In some respects, user interface 300 can be considered a more classic or traditional view in an online financial or banking system. For instance, the three panes from left to right, specifically options pane 301, transactions pane 302, and details pane 304 show information in a more traditional format. By contrast, some of the alternative user interfaces depicted herein allow for presentation of similar material, specifically accounts, transactions, services, and so forth, differently. Moreover, as explained further herein, a user may switch between different user interfaces as they wish. For instance, one user may prefer a first view and another user a second view. Or in some cases, certain information may be more easily accessed in with a certain user interface in some contexts. In yet other cases, virtual reality or other interactive techniques may be used.

Figure 4A:
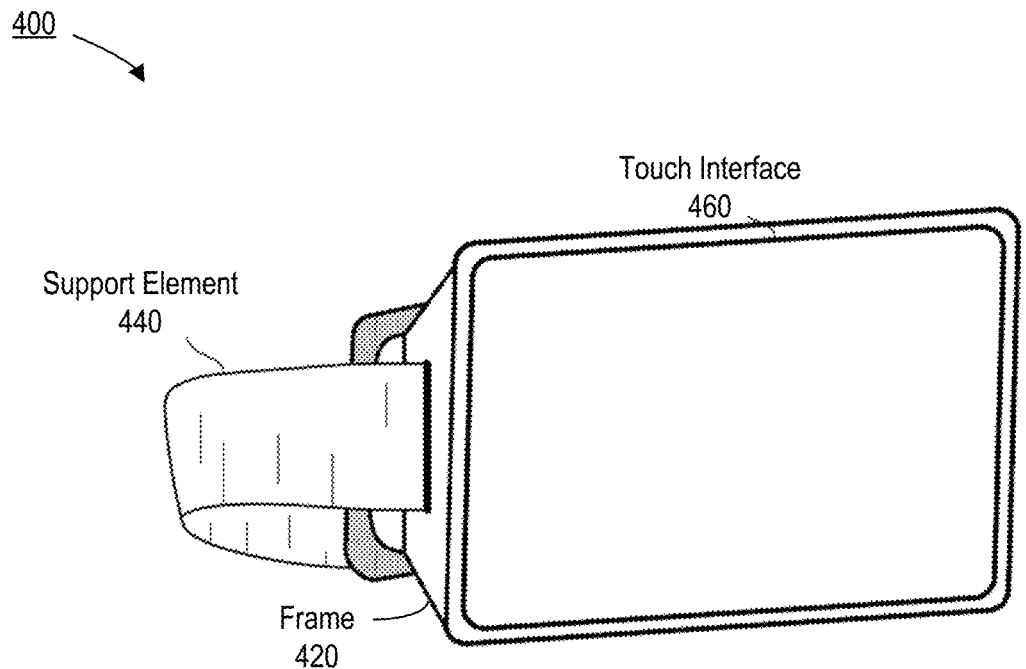
FIGS. 4A and 4B, depicts an example of a virtual reality device for use with an electronic financial system, in accordance with an embodiment.
Figure 4B:
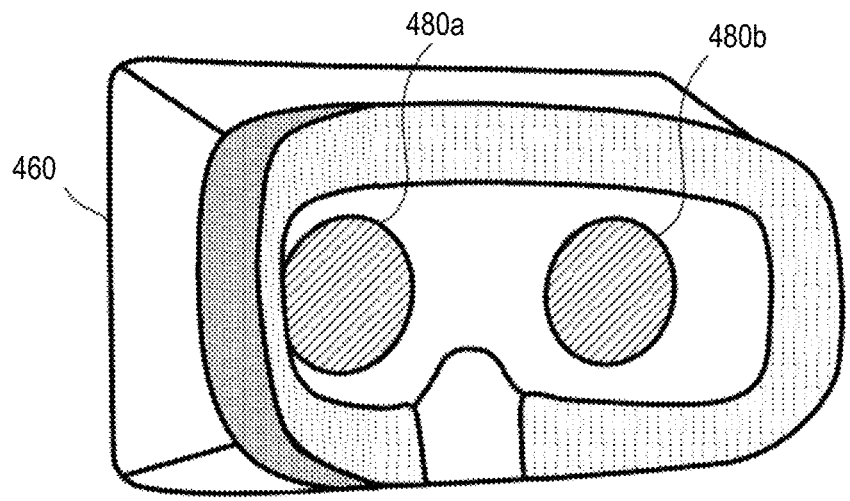

FIG. 4, which includes FIGS. 4A and 4B, depicts an example of a virtual reality device 400 for use with an electronic financial system, in accordance with an embodiment. Virtual reality device 400 (or simply, "VR device") can be used with the user interfaces described herein. Virtual reality device 400 allows users to interact with the electronic financial system in a VR environment. The user interfaces described herein can be visualized as a virtual room and VR device 400 enabling the user to move freely as if they were in the room.

For example, virtual reality headset devices allow users to experience more complex and realistic environments by displaying two or three-dimensional content, or simulated three-dimensional content that relates to financial services, including videos, animations, and so forth. VR device 400 is also capable of displaying three-dimensional movies, video games, scenes, or simulations that allow users to interact with the virtual reality environment.

FIG. 4A depicts includes a housing frame 420, a support element (e.g., a strap) 440, and optional touch interface 460. The VR device 400 also includes a display screen (not shown) inside the housing frame 420, and a plurality of lenses (described in more detail in FIG. 4B). In some embodiments, the VR device 400 includes additional components, features, or capabilities. For example, the VR device 400 includes or allows other input devices, such as motion sensors, accelerometers, gyroscopes, cameras or handheld controllers.

As mentioned, the VR device 400 provides a virtual reality environment to a user. For instance, the VR device 400 displays a movie, panoramic scene, photographs or images, content browser (e.g., a photo or media content album), and/or a two or three-dimensional environment to the user via the display screen. In at least some instances, the VR device 400 allows the user to interact with the virtual reality environment by way of one or more input devices. For example, the user can change the view within the environment or move within the environment by moving his or her head or physically moving from one location to another (i.e., changing the position of the user's head laterally or vertically). This movement can cause the VR device 400 to change the view within the interface. Similarly, when a user moves backward, forward, or sideways, VR device 400 is adjusted to show the user having moved to a different location within the virtual room.

The VR device 400 also includes a support element 440 to hold the VR device 400 in place as the user views the virtual reality environment provided by way of the display screen. Specifically, the support element 440 can hold the VR device 400 in place so that the perspective of displayed content provided to the user is consistent. In one example, the support element 440 is a flexible strap. Alternatively, the support element 440 can be an adjustable support element 440 that allows the user to adjust the fit of the VR device 400 for comfort and stability.

FIG. 4B illustrates the housing frame 420 of the VR device 400 with a plurality of lenses 480*a-b*. The lenses 480*a-b* modify how content on the display screen appears to the user. For example, the lenses 480*a-b* are positioned to correspond to the predetermined eye positions of the user, such that the housing frame 420 includes a left lens corresponding to the left predetermined eye position and a right lens corresponding to the right eye position.

Figure 5:
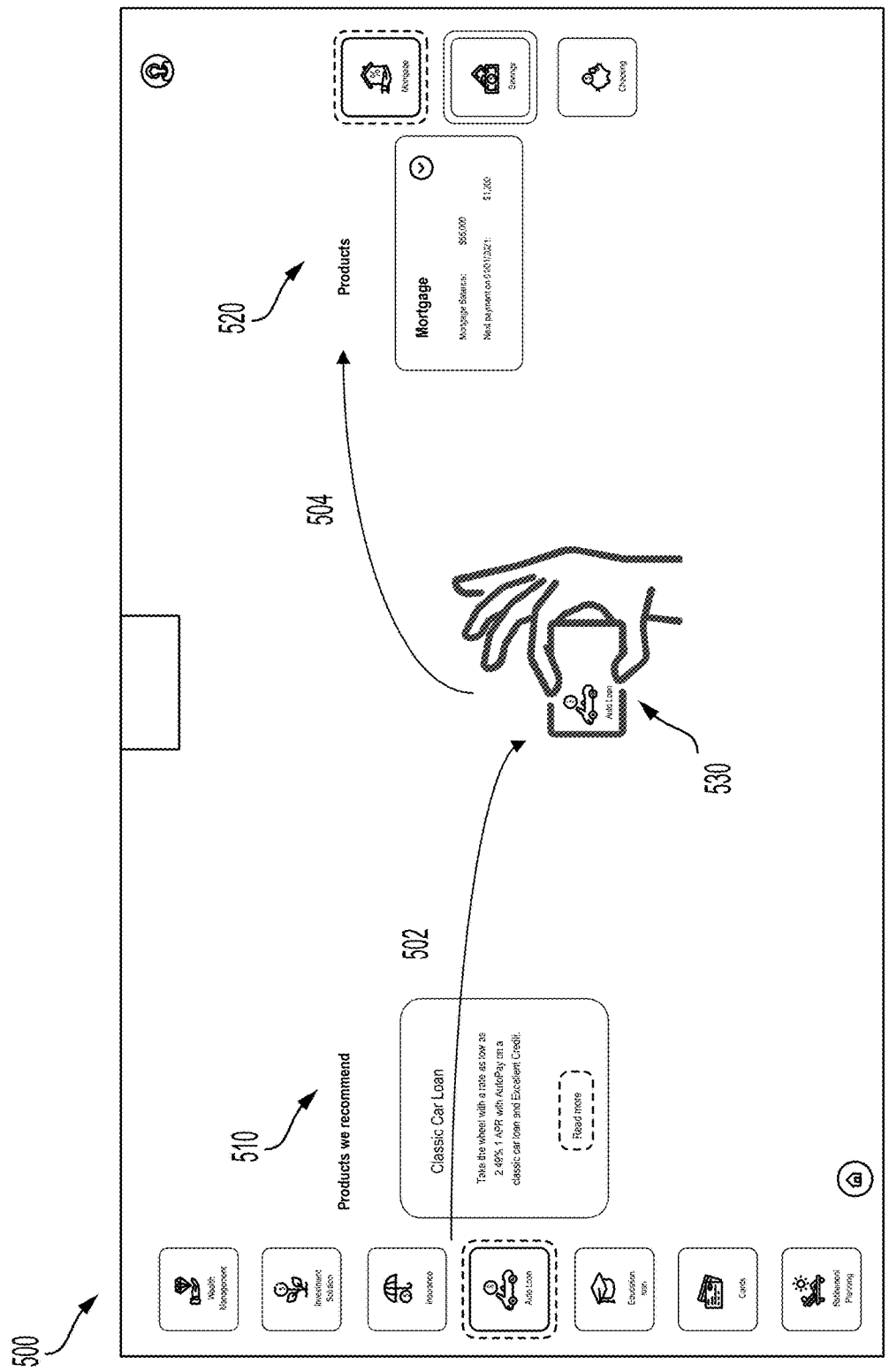
FIG. 5 depicts an example of a drag-and-drop based interface of an electronic financial system, in accordance with an embodiment.

FIG. 5 depicts an example of a drag-and-drop based interface of an electronic financial system, in accordance with an embodiment. FIG. 5 depicts interface 500, which includes recommended products 510, products 520, and hand 530. As can be seen, hand 530, representing one or more fingers or hands of a user of a virtual reality device, can select an object such as "auto loan" from the recommended products 510, and drag the object to products 520. This select and drag is shown with drags 502 and 504.

Selection can be accomplished via tap, double tap, and/or pinch. Drag can be accomplished by squeezing, or pinching, the icon before and during the drag. Other gestures can be used. For instance, selection can include a pinch gesture and placement of the object includes a relaxing of the pinch gesture. The selection can result in a "drop" visualization. In another example, the selection includes a first tap at a first location (e.g., at recommended products 510) and the placement includes a second tap at a second location (e.g., products 520). In another example, a selection can include a drag gesture of a finger.

Figure 6:
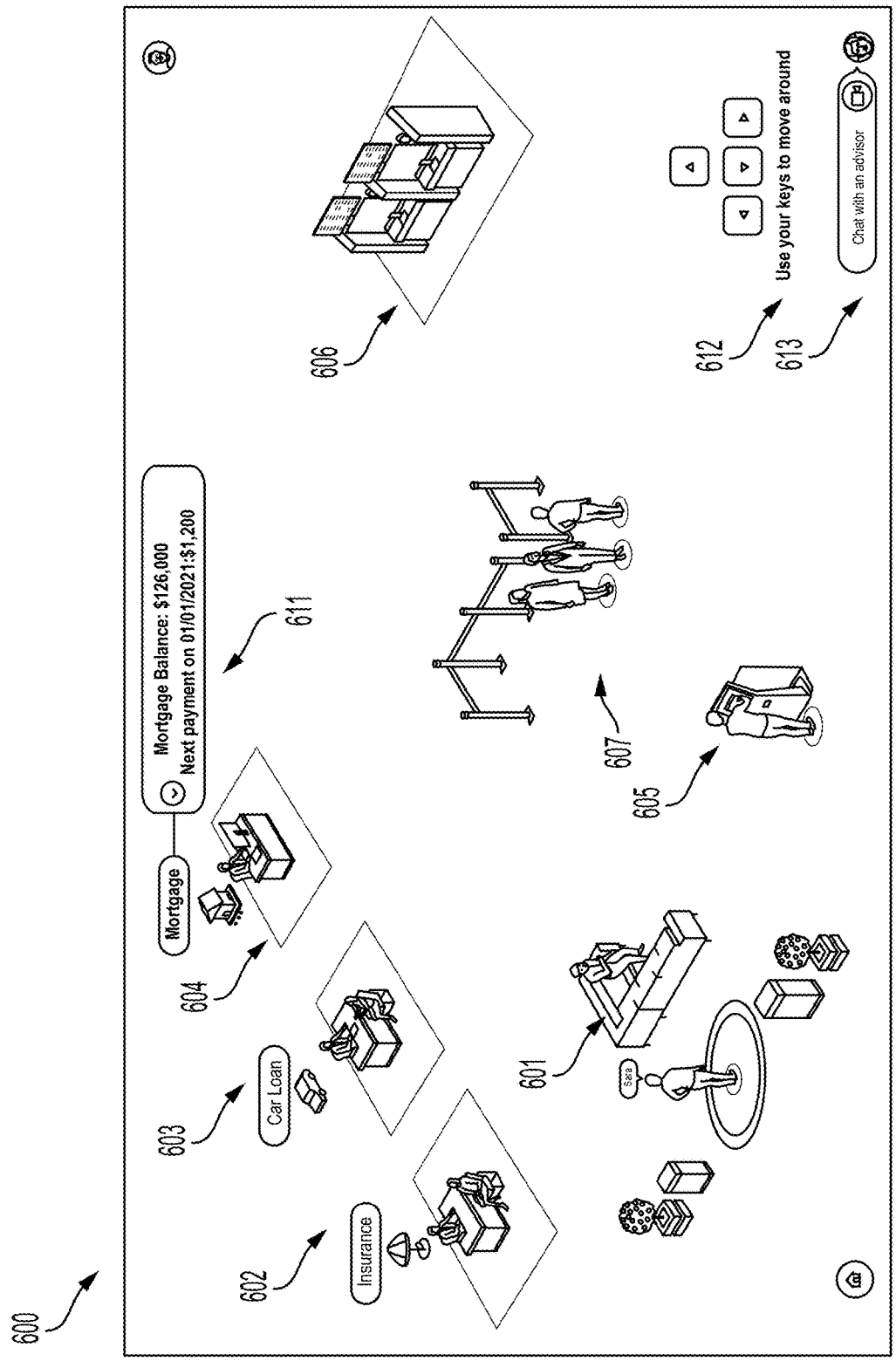
FIG. 6 depicts an example of a gamified user interface of an electronic financial system, in accordance with an embodiment.

FIG. 6 depicts an example of a gamified user interface 600 of an electronic financial system, in accordance with an embodiment. User interface 600 depicts a virtual room having multiple stations, each represented by one or more avatars. For instance, as depicted, user interface 600 includes financial services stations 601, 602, 603, 604, 605, and 606, each having a virtual desk or table. Optionally, the avatars can be visualized as sitting or standing at the tables.

Each of stations 601-606 can correspond to a financial service product or function and can have an associated avatar representing a virtual financial services person who can help and/or avatars of customers who are waiting for assistance. User interface 600 can be viewed as a type of dashboard that depicts available services. Different services or vendors, representing loans, insurance, and so forth are represented by virtual vendors.

When a user wishes to transact with at a specific station, they can click an area around the vendor to virtually approach the avatar. When viewed with VR device 400, the user may navigate this interface by moving and/or turning. In turn the sensors of the VR device recognize the users movements and adjust user interface 600 accordingly.

Other user interface elements are not shown but are possible. For instance, one or more highlighted (shiny, moving, etc.) interface objects can be depicted. These objects can represent offers such as a deal on an auto loan rate, or an offer on a savings account. In other cases, one or more virtual catalog objects can be depicted in a virtual newsstand. These catalog objects can be interacted with and open into another window, whereby the user may view the contents of the catalog. In yet other embodiments, the user may switch to an autonomous agent view.

Queue 607 is a virtual queue in which a number of people, represented by avatars, are depicted as waiting for their turn. In some cases, the avatars can be animated, for instance, interacting with each other or speaking with each other. In some cases, the interactions can relate to experiences with the products and services represented by stations 601-606.

Navigation objects 612 serve as indicators that the user may navigate using their keyboard (specifically with the up, down, left, and right buttons). Chat window 613 is available for interactions with either a human or autonomous agent. If financial documents are to be reviewed and signed, then user interface 600 can cause a window that is overlayed on the user interface or a pop-up window to be depicted that enables viewing of documents in Portable Document Format (PDF) or other format. Electronic signatures can be obtained via user interface 600.

If a station 601-606 is selected for further information, then one or more menus can appear. For instance, details 611 show balances associated with the product associated with station 604.

Figure 7:
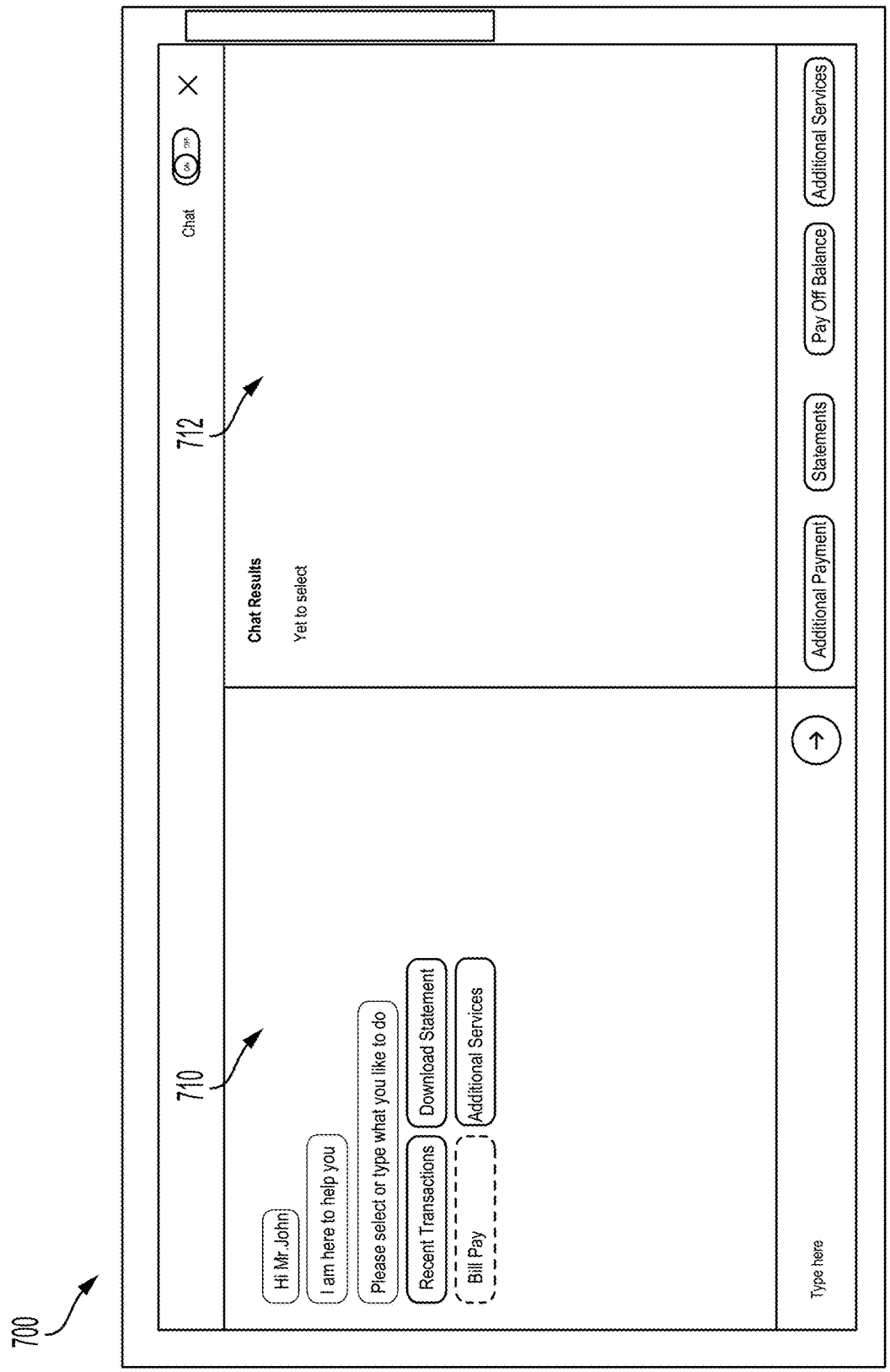
FIG. 7 depicts an example of an autonomous agent-based user interface of an electronic financial system, in accordance with an embodiment.

FIG. 7 depicts an example of an autonomous agent-based user interface 700 of an electronic financial system, in accordance with an embodiment. User interface 700 depicts agent area 710 and user area 712. As can be seen, relative to agent area 710, agent area 710 includes additional user interface objects and a slider representing an amount for a transaction.

Figure 8:
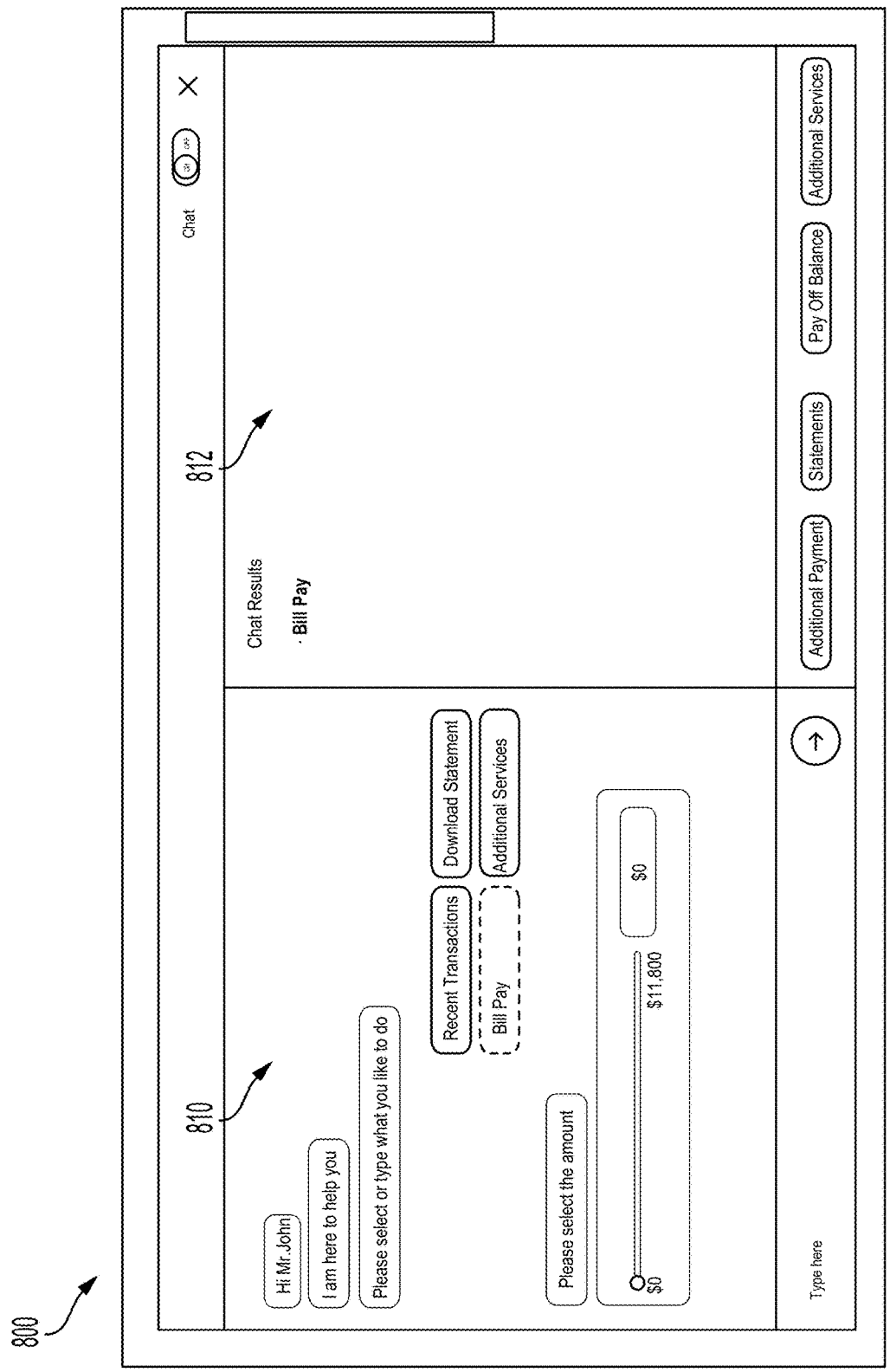
FIG. 8 depicts an example of an autonomous agent-based user interface of an electronic financial system, in accordance with an embodiment.

FIG. 8 depicts an example of an autonomous agent-based user interface 800 of an electronic financial system, in accordance with an embodiment. User interface 800 depicts agent area 810 and user area 812. As can be seen, relative to agent area 710, agent area 810 includes additional user interface objects and a slider representing an amount for a transaction.

Figure 9:
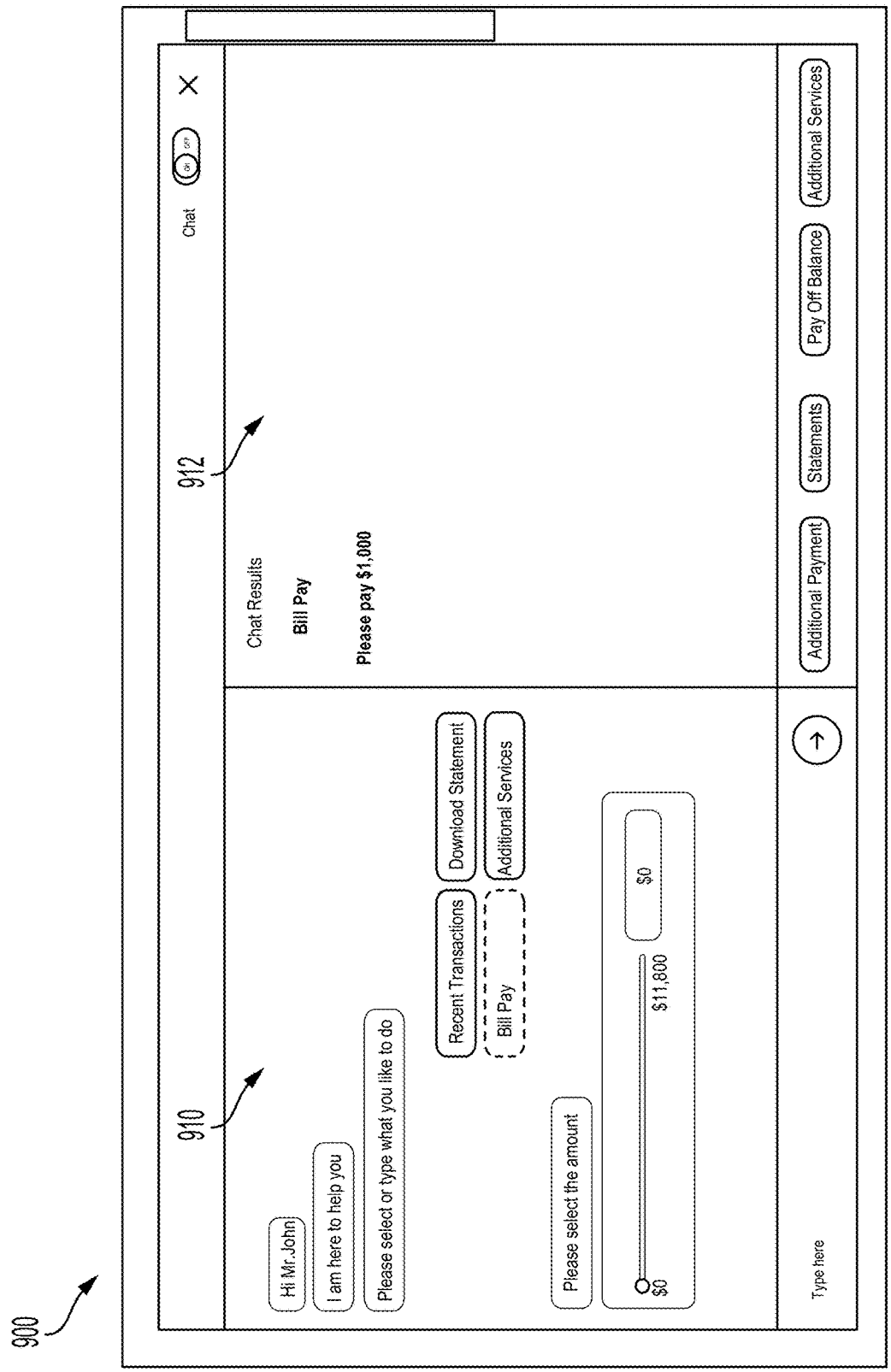
FIG. 9 depicts an example of an autonomous agent-based user interface of an electronic financial system, in accordance with an embodiment.

FIG. 9 depicts an example of an autonomous agent-based user interface 900 of an electronic financial system, in accordance with an embodiment. User interface 900 depicts agent area 910 and user area 912. As can be seen, relative to agent area 810, agent area 910 includes an additional message "Please pay $1,000."

Figure 10:
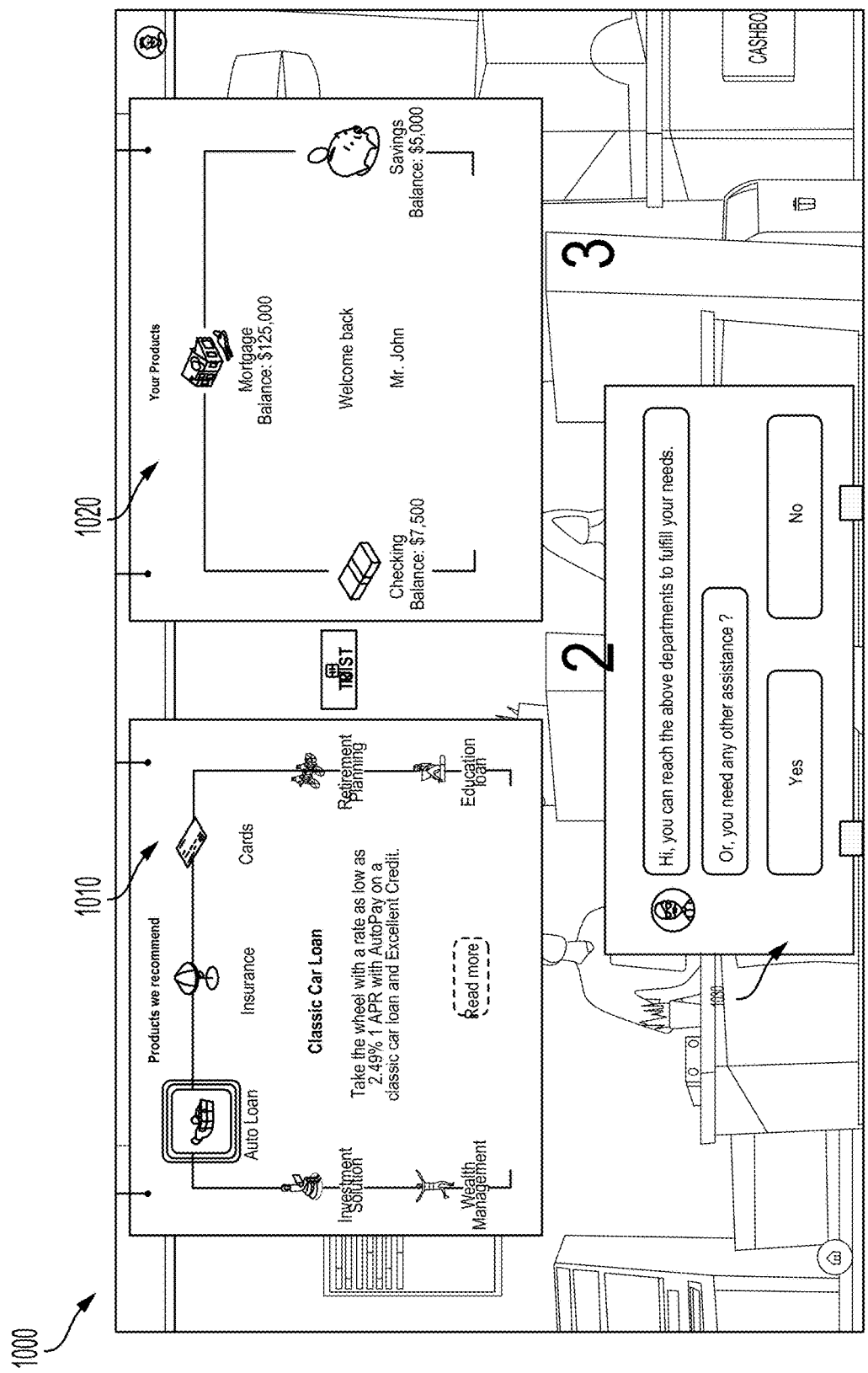
FIG. 10 depicts an example of a hybrid user interface of an electronic financial system, in accordance with an embodiment.

FIG. 10 depicts an example of a hybrid user interface 1000 of an electronic financial system, in accordance with an embodiment. User interface 1000 depicts area 1010, area 1020, and area 1030. As shown, area 1010 includes recommended products, area 1020 includes products that the user already has, and area 1030 includes an autonomous agent window. User interface 1000 can be accessed via login screen, e.g., user interface 200 as depicted in FIG. 2.

The recommended products in area 1020 can be adjusted based on the user's personal data and/or financial information. For instance, a screen might ask "have checking but would you like insurance also?"

Figure 11:
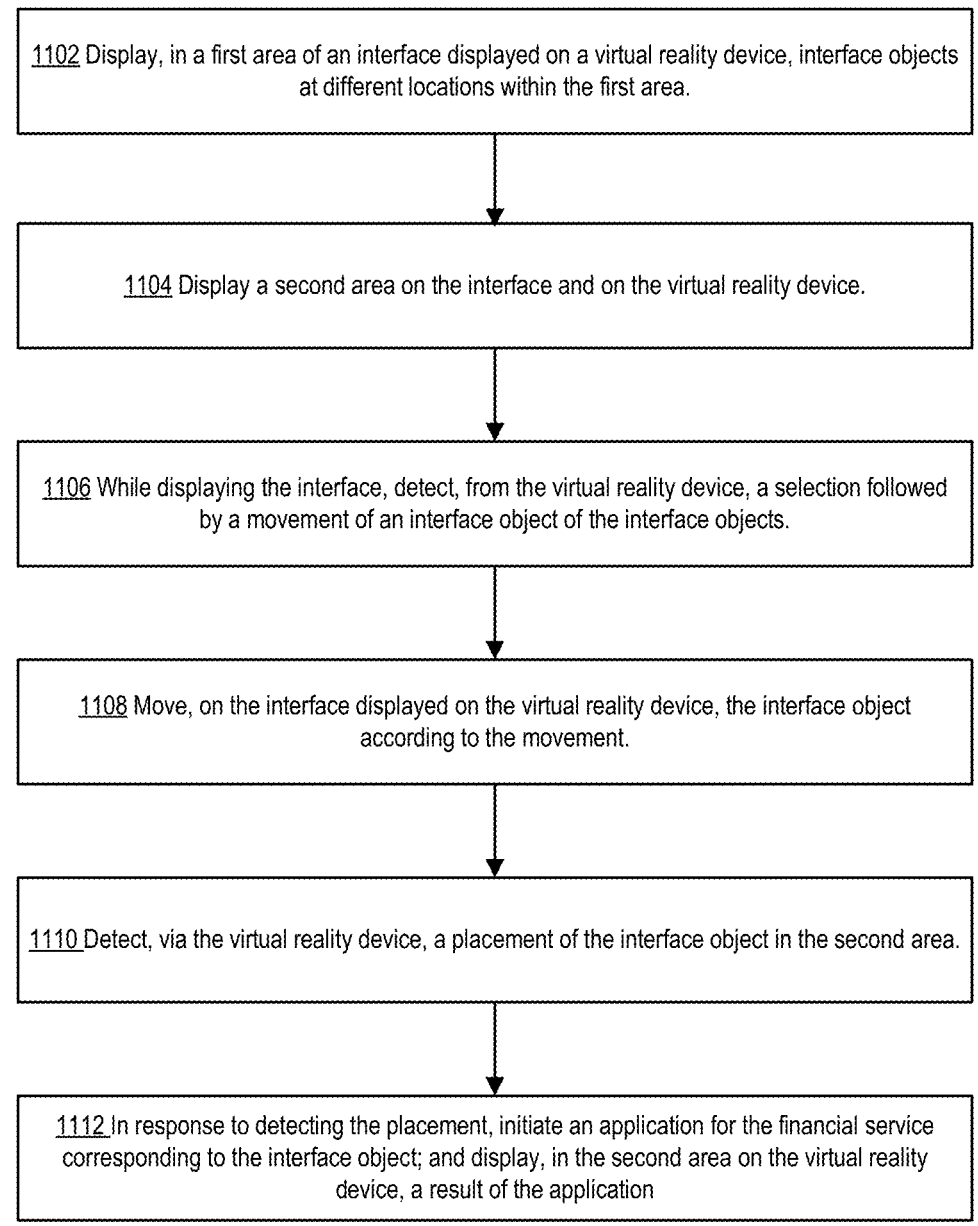
FIG. 11 depicts a flowchart of an example of a method of customizing user interfaces for interacting with financial systems, in accordance with an embodiment.

FIG. 11 depicts a flowchart of an example of a method of customizing user interfaces for interacting with financial systems, in accordance with an embodiment. FIG. 11 is discussed with respect to the system of FIG. 1 for illustrative purposes.

It should be appreciated that while method 1100 is set forth below as including various operations, other sequences of operations may also be performed. For example, the steps outlined below may be performed in a different order. Moreover, the individual steps illustrated by method 1100 may include multiple sub-operations that may be performed in various sequences as appropriate to the individual operation. Furthermore, additional operations may be added or removed depending on the particular applications. One of the ordinary skill in the art would recognize many variations, modifications, and alternatives.

At block 1102, method 1100 involves displaying, in a first area of an interface displayed on a virtual reality device, interface objects at different locations within the first area. Each interface object represents one of a plurality of financial services available within a financial system. For instance, referring back to FIGS. 1 and 5, computing system 110 displays interface 500 on a VR headset. As can be seen, different objects in recommended product 510 are available in a first area on the left hand side.

At block 1104, method 1100 involves displaying a second area on the interface and on the virtual reality device. Continuing the example, computing system 110 displays interface 500. As can be seen, in a second area is shown on the right hand side, e.g. products 520.

At block 1106, method 1100 involves, while displaying the interface, detecting, from the virtual reality device, a selection followed by a movement of an interface object of the interface objects. Various gestures are possible, as discussed with respect to FIG. 5, for instance, pinch, tap, and so forth.

At block 1108, method 1100 involves moving, on the interface displayed on the virtual reality device, the interface object according to the movement. Computing system 110 updates the object as shown in FIG. 5.

At block 1110, method 1100 involves detecting, via the virtual reality device, a placement of the interface object in the second area. Various gestures and possible, for example, releasing of a pinch gesture.

At block 1112, method 1100 involves, in response to detecting the placement, initiating an application for the financial service corresponding to the interface object; and displaying, in the second area on the virtual reality device, a result of the application.

In some cases, a user may switch back and forth between different interfaces. For instance, computing system 110 can display interface objects that each are associated with a respective main interface. Each of the main interfaces enables a user to access data and transact with one or more of the financial services. The main interfaces can include a first main interface having a first window depicting financial services and a second window depicting transactions corresponding to at least one of the financial services (e.g., FIG. 3). The main interfaces can also include a second main interface having avatar interface objects at different locations within the second main interface (e.g., FIG. 6). Other interfaces are possible. Continuing the example, while displaying the interface on the virtual reality device, computing system 110 detects a selection of an interface object from the virtual reality device. In response to receiving the selection, computing system 110 updates the interface with the main interface that corresponds to the selected object.

Figure 12:
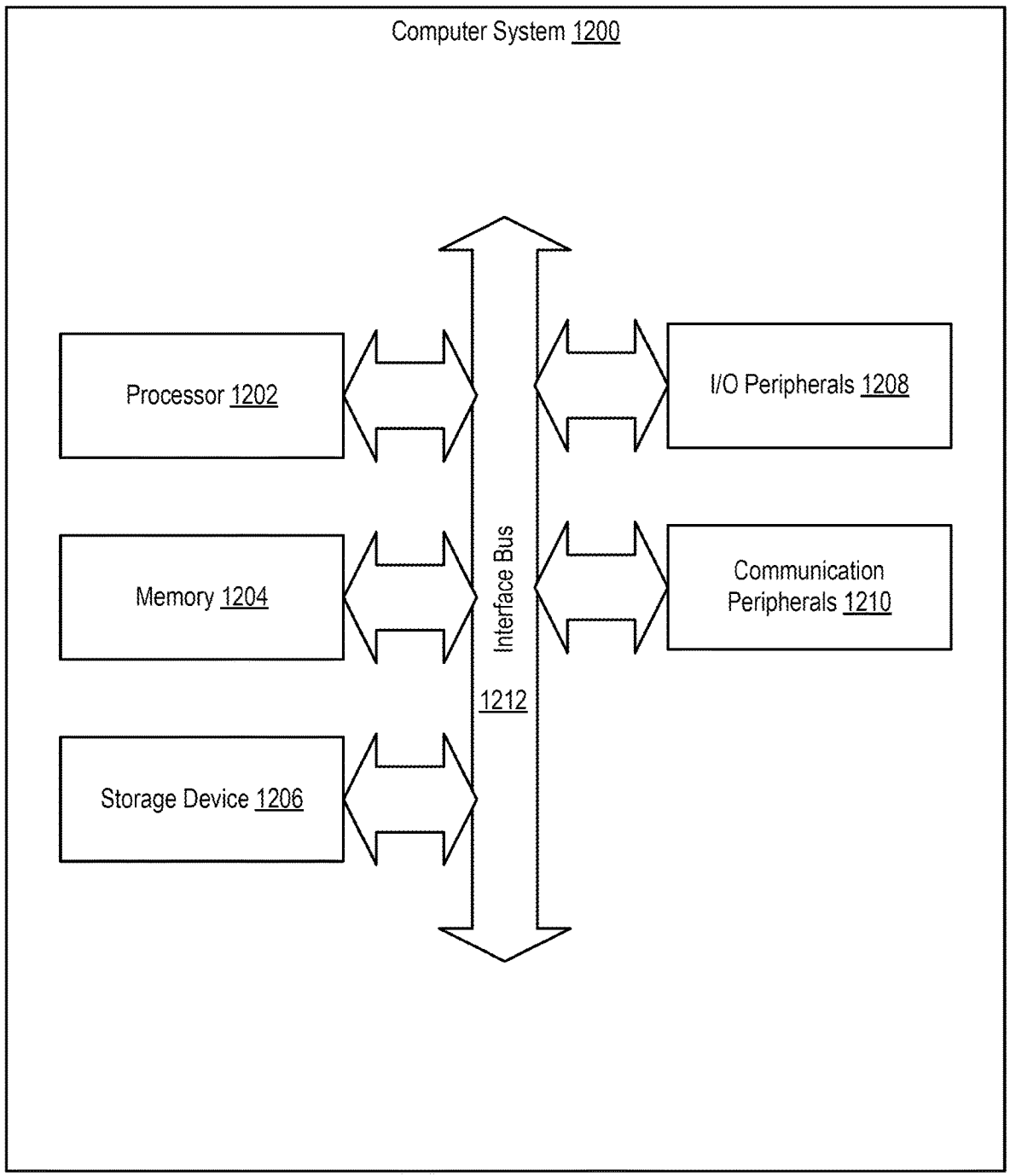
FIG. 12 illustrates an example of a computer system, in accordance with an embodiment.

FIG. 12 illustrates an example of a computer system 1200, in accordance with an embodiment. The computer system 1200 is an example of the computer system described herein above. Although these components are illustrated as belonging to a same computer system 1200, the computer system 1200 can also be distributed.

The computer system 1200 includes at least a processor 1202, a memory 1204, a storage device 1206, input/output peripherals (I/O) 1208, communication peripherals 1210, and an interface bus 1212. The interface bus 1212 is configured to communicate, transmit, and transfer data, controls, and commands among the various components of the computer system 1200. The memory 1204 and the storage device 1206 include non-transitory computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1204 and the storage device 1206 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1200.

Further, the memory 1204 includes an operating system, programs, and applications. The processor 1202 is configured to execute the stored instructions and includes, for example, a logical processing unit, a microprocessor, a digital signal processor, and other processors. The memory 1204 and/or the processor 1202 can be virtualized and can be hosted within another computer system of, for example, a cloud network or a data center. The I/O peripherals 1208 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1208 are connected to the processor 1202 through any of the ports coupled to the interface bus 1212. The communication peripherals 1210 are configured to facilitate communication between the computer system 1200 and other computing devices over a communications network and include, for example, a network interface controller, modem, wireless and wired interface cards, antenna, and other communication peripherals.

In the following, further examples are described to facilitate the understanding of the invention.

In an example, a method includes displaying an initial user interface including user interface objects. Each object is associated with a respective main user interface. Each of the main user interfaces enables a user to access data and transact with one or more financial services available within a financial system. The main user interfaces include a first main user interface having a first window depicting the financial services and a second window depicting transactions corresponding to at least one of the financial services. The main user interfaces include a second main user interface having avatar user interface objects at different locations within the second main user interface. Each avatar user interface object represents one of the financial services. The main user interfaces include a third user main interface having the first window depicting one of the financial services and a third window depicting interactions with an autonomous agent. The autonomous agent is configured to enable the user to interact with the one of the financial services. The method further includes, while displaying the initial user interface, detecting a selection of an object by the user. The method further includes, in response to receiving the selection, performing operations. The operations include displaying the main user interface that corresponds to the selected object. The operations further include receiving, via the main user interface, a request to transact with one of the financial services. The operations further include presenting, on the main user interface, results of a transaction associated with the financial service.

In an embodiment, the main user interface includes the user interface objects. The method further includes while displaying the main user interface, detecting an additional selection of an additional object by the user. The additional object is different from the object. The method further includes, in response to receiving the additional object, displaying an additional main user interface that corresponds to the additional object.

In an embodiment, displaying the initial user interface includes presenting the initial user interface in a virtual reality device, displaying the main user interface includes presenting the main user interface in the virtual reality device, and receiving the selection of the object includes receiving a selection via the virtual reality device.

In an embodiment, the main user interface is the second main user interface and the avatar user interface objects represent banking functions within a bank the different locations represent different locations within the bank.

In an embodiment, the main user interface is the third main user interface. The method further includes determining a first message including information regarding the selected one of the financial services. The method further includes outputting, in a first area of the main user interface, the first message and a additional user interface objects, each of the additional user interface objects relating the selected one of the financial services. The method further includes receiving, via the main user interface, a selection of one of the additional user interface objects. The method further includes presenting, on the main user interface, results of an additional transaction associated with the selected one of the financial services.

In an embodiment, receiving the selection of the object includes receiving a selection via a keyboard or a mouse.

In an embodiment, the initial user interface and the main user interface are displayed in a web browser.

In an example, a method includes displaying a user interface having avatar user interface objects at different locations within the user interface. Each avatar user interface object represents one of a financial services available within a financial system. The method further includes, while displaying the user interface, detecting a selection of an avatar user interface object of the avatar user interface objects. The method further includes, in response to the detection, displaying, within the user interface, an area representing an autonomous agent that is configured to enable interactions with the one of the financial services. The method further includes generating, via the autonomous agent, text corresponding to the financial service associated with the selected avatar user interface object. The method further includes presenting the text in the area as appearing from the autonomous agent. The method further includes receiving, via the user interface, a response corresponding to selection of one of the financial services. The method further includes causing, based on receiving the response, a server to perform a transaction within the selected financial service. The method further includes presenting, in the area, results of the transaction.

In another example, causing the server to perform the response further includes providing the response to a classification model, and determining, via the classification model, the transaction.

In another example, the method further includes outputting, with the text and in the area, an additional user interface objects. Each of the additional user interface objects relating the selected one of the financial services. The method further includes receiving, via the user interface, a selection of one of the additional user interface objects. The method further includes causing, based on the selection, a server to perform an additional transaction within the selected financial service. The method further includes presenting, on the user interface, results of the additional transaction.

In an example, the method includes displaying, on the user interface, additional user interface objects, each object associated with an additional user interface. Each of the additional user interfaces enables a user device to access data and transact with one or more of the financial services. The method further includes while displaying the user interface, detecting a selection of an additional user interface object by the user device. The method further includes, in response to receiving the selection, displaying the additional user interface that corresponds to the selected object.

In another example, the additional user interfaces include one or more of a first additional user interface having a first window depicting the financial services and a second window depicting transactions corresponding to at least one of the financial services; and a second additional user interface having a avatar user interface objects at different locations within the second additional user interface. Each avatar user interface object represents one of the financial services.

In another example, the method includes displaying the user interface in a display of a virtual reality headset. The response is received from a microphone associated with the virtual reality headset.

In another example, the user interface is displayed in a virtual reality headset. The response is obtained from a virtual reality device.

While the above examples are discussed as computer-implemented methods, it will be appreciated that the above functionality can be implemented in a system such as a computer system and/or as computer-executable instructions stored on a non-transitory computer-readable medium.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. And, although the subject matter has been described with reference to financial account systems and financial account data, various aspects disclosed herein can be applicable to other types of account systems and other types of data.

The invention claimed is:

1. A method comprising:
displaying a user interface comprising a plurality of interface objects that enable a user to access data and to transact with one or more of a plurality of financial services and transactions corresponding to at least one of the financial services, wherein the plurality of interface objects is displayed on a two dimensional portion of the user interface;
displaying, on the user interface, a plurality of avatar interface objects that enable the user to access the data and to transact with one or more of the plurality of the financial services, wherein the plurality of avatar interface objects are displayed on a three dimensional portion of the user interface;
detecting, via the user interface, a selection of an avatar interface object from the plurality of avatar interface objects;
in response to detecting the selection of the avatar interface object:
removing, from the user interface, one or more interface objects of the plurality of interface objects;
detecting a movement of the selected avatar interface object;
moving, on the user interface, the selected avatar interface object according to the movement;
detecting a placement of the selected avatar interface object on the user interface; and
in response to detecting the placement:
initiating an application for the financial service corresponding to the selected avatar interface object; and
displaying, on the user interface, a result of the application.

2. The method of claim 1, wherein the plurality of avatar interface objects are displayed on a first area of the user interface and the selected avatar interface object is moved to a second area on the user interface.

3. The method of claim 2, wherein the second area on the user interface displays a plurality of selected avatar interface objects representing different financial services.

4. The method of claim 1, further comprising, in response to detecting the placement, displaying an additional avatar user interface object on the user interface.

5. The method of claim 1, wherein the selection, moving, and the placement of the avatar interface object is accomplished by a mechanism selected from the group consisting of:
selection by a pinch gesture at a first location of the user interface and placement by a relaxing of the pinch gesture at a second location of the user interface,
selection by a first tap at the first location of the user interface and placement by a second tap at the second location of the user interface, and
dragging the selected avatar interface object from the first location of the user interface to the second location of the user interface by a drag gesture of a finger of the user, and releasing the selected avatar interface object at the second location of the user interface.

6. The method of claim 1, wherein initiating the application comprises transmitting, to a financial server device, information associated with the user, the method further comprising obtaining the result, wherein the result is determined by the financial server device based on the information.

7. The method of claim 1, further comprising:
receiving an interaction via the user interface;
in response to the interaction, adjusting the plurality of avatar interface objects on the user interface;
receiving, via the user interface, an additional selection of an avatar interface object of the plurality of avatar interface objects; and in response to the additional selection, initiating an additional application for a financial service corresponding to the selected avatar interface object.

8. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
displaying a user interface comprising a plurality of interface objects that enable a user to access data and to transact with one or more of a plurality of financial services and transactions corresponding to at least one of the financial services, wherein the user interface includes a two dimensional portion for display of the plurality of interface objects;
displaying, on the user interface, a plurality of avatar interface objects that enable the user to access the data and to transact with one or more of the plurality of the financial services, wherein the user interface includes a three dimensional portion for display of the plurality of avatar interface objects;
detecting, via the user interface, a selection of an avatar interface object from the plurality of avatar interface objects;
in response to detecting the selection of the avatar interface object:
removing, from the user interface, one or more interface objects of the plurality of interface objects;
detecting a movement of the selected avatar interface object;
moving, on the user interface, the selected avatar interface object according to the movement;
detecting a placement of the selected avatar interface object on the user interface; and
in response to detecting the placement:
initiating an application for the financial service corresponding to the selected avatar interface object; and
displaying, on the user interface, a result of the application.

9. The system of claim 8, wherein the user interface includes a first area for displaying the plurality of avatar interface objects and a second area to which the selected avatar interface object is movable.

10. The system of claim 9, wherein a plurality of selected avatar interface objects representing different financial services are displayable on the second area of the user interface.

11. The system of claim 8, wherein executing the computer-executable program instructions configures the processing device to display an additional avatar user interface object on the user interface in response to detecting the placement.

12. The system of claim 8, wherein executing the computer-executable program instructions configures the processing device to:
initiate the application by transmitting, to a financial server device, information associated with the user; and
obtain the result from the financial server device, where the result is based on the information.

13. The system of claim 8, wherein the selection, moving, and the placement of the avatar interface object is accomplishable by a mechanism selected from the group consisting of:
selection by a pinch gesture at a first location of the user interface and placement by a relaxing of the pinch gesture at a second location of the user interface,
selection by a first tap at the first location of the user interface and placement by a second tap at the second location of the user interface, and
dragging the selected avatar interface object from the first location of the user interface to the second location of the user interface by a drag gesture of a finger of the user, and releasing the selected avatar interface object at the second location of the user interface.

14. The system of claim 8, wherein executing the computer-executable program instructions configures the processing device to:
receive an interaction via the user interface;
in response to the interaction, adjust the plurality of avatar interface objects on the user interface;
receive, via the user interface, an additional selection of an avatar interface object of the plurality of avatar interface objects; and
in response to the additional selection, initiate an additional application for a financial service corresponding to the selected avatar interface object.

15. A non-transitory computer-readable storage medium storing computer-executable program instructions that are executable by a processing device, the computer-executable program instructions cause the processing device to perform operations comprising:
displaying a user interface comprising a plurality of interface objects that enable a user to access data and to transact with one or more of a plurality of financial services and transactions corresponding to at least one of the financial services, wherein the user interface includes a two dimensional portion for display of the plurality of interface objects;
displaying, on the user interface, a plurality of avatar interface objects that enable the user to access the data and to transact with one or more of the plurality of the financial services, wherein the user interface includes a three dimensional portion for display of the plurality of avatar interface objects;
detecting, via the user interface, a selection of an avatar interface object from the plurality of avatar interface objects;
in response to detecting the selection of the avatar interface object:
removing, from the user interface, one or more interface objects of the plurality of interface objects;
detecting a movement of the selected avatar interface object;
moving, on the user interface, the selected avatar interface object according to the movement;
detecting a placement of the selected avatar interface object on the user interface; and
in response to detecting the placement:
initiating an application for the financial service corresponding to the selected avatar interface object; and
displaying, on the user interface, a result of the application.

16. The non-transitory computer-readable storage medium of claim 15, wherein when executed by a processing device, the computer-executable program instructions cause the processing device to display an additional avatar user interface object on the user interface in response to detecting the placement.

17. The non-transitory computer-readable storage medium of claim 15, wherein when executed by a processing device, the computer-executable program instructions cause the processing device to:
   initiate the application by transmitting, to a financial server device, information associated with the user; and
   obtain the result from the financial server device, where the result is based on the information.

18. The non-transitory computer-readable storage medium of claim 15, wherein when executed by a processing device, the computer-executable program instructions cause the processing device to:
   receive an interaction via the user interface;
   in response to the interaction, adjust the plurality of avatar interface objects on the user interface;
   receive, via the user interface, an additional selection of an avatar interface object of the plurality of avatar interface objects; and
   in response to the additional selection, initiate an additional application for a financial service corresponding to the selected avatar interface object.

\* \* \* \* \*